US012417040B1

(12) United States Patent
Fernandez Orellana et al.

(10) Patent No.: US 12,417,040 B1
(45) Date of Patent: Sep. 16, 2025

(54) REQUEST OVER-BATCH PROCESSING FOR MACHINE LEARNING MODELS

(71) Applicant: Dell Products L.P., Round Rock, TX (US)

(72) Inventors: Pedro Fernandez Orellana, Surfers Paradise (AU); Qiang Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/820,431

(22) Filed: Aug. 30, 2024

(51) Int. Cl.
G06F 3/06 (2006.01)

(52) U.S. Cl.
CPC .......... G06F 3/0631 (2013.01); G06F 3/0607 (2013.01); G06F 3/0683 (2013.01)

(58) Field of Classification Search
CPC ..... G06F 3/0631; G06F 3/0607; G06F 3/0683
See application file for complete search history.

(56) References Cited

U.S. PATENT DOCUMENTS

| | | | | |
|---|---|---|---|---|
| 2016/0062781 A1* | 3/2016 | Tsirkin | ........... | G06F 3/0656 718/1 |
| 2021/0109912 A1* | 4/2021 | Biswas | ........... | G06F 21/602 |
| 2023/0127869 A1* | 4/2023 | Tai | ........... | G06F 9/5038 718/103 |

OTHER PUBLICATIONS

K. Li, Y. Zhang, J. Xu and C. Xu, "Dynamic Memory Allocation and Data Sharing Schedule in Media Server," 2007 IEEE International Conference on Multimedia and Expo, Beijing, China, 2007, pp. 72-75, (Year: 2007).*
B. Fauber, "Unleashing the Power of Large Language Models like ChatGPT for Your Business," Dell Technologies White Paper, Mar. 2023, 4 pages.
C. Anil et al., "Exploring Length Generalization in Large Language Models," 36th Conference on Neural Information Processing Systems, Jul. 2022, 11 pages.
Open AI, "GPT-3 Powers the Next Generation of Apps," https://openai.com/index/gpt-3-apps/, Mar. 25, 2021, 10 pages.
Y. Jin et al., "S3: Increasing GPU Utilization during Generative Inference for Higher Throughput," arXiv:2306.06000v1, Jun. 9, 2023, 12 pages.

* cited by examiner

*Primary Examiner* — Khoa D Doan
(74) *Attorney, Agent, or Firm* — Ryan, Mason & Lewis, LLP

(57) ABSTRACT

An apparatus comprises at least one processing device configured to determine, for a given batch to be executed utilizing at least one machine learning model, a number of requests to include based on an over-batching multiplier. The at least one processing device is also configured to allocate memory for processing the given batch, wherein an amount of memory allocated for at least requests in the given batch is less than that required for storage of a maximum output sequence length of the at least one machine learning model. The at least one processing device is further configured to execute the given batch utilizing the at least one machine learning model and, responsive to determining that at least one memory reallocation condition has been triggered during execution of the given batch, to adjust the allocation of the memory to one or more of the requests in the given batch.

20 Claims, 14 Drawing Sheets

REQUEST OVER-BATCH PROCESSING FOR MACHINE LEARNING MODELS

BACKGROUND

As the value and use of information continues to increase, individuals and businesses seek additional ways to process and store information. Information processing systems may be used to process, compile, store and communicate various types of information, including through the use of artificial intelligence (AI) and machine learning (ML). Large language models (LLMs) are a type of AI system that uses ML algorithms to process vast amounts of natural language text data. LLMs may be used to perform various natural language processing (NLP) tasks, including text classification, text summarization, text generation, named entity recognition, text sentiment analysis, and question answering.

SUMMARY

Illustrative embodiments of the present disclosure provide techniques for request over-batch processing for machine learning models.

In one embodiment, an apparatus comprises at least one processing device comprising a processor coupled to a memory. The at least one processing device is configured to determine, for a given batch to be executed utilizing at least one machine learning model, a number of requests to include in the given batch based at least in part on an over-batching multiplier. The at least one processing device is also configured to allocate memory for processing the given batch utilizing the at least one machine learning model, wherein an amount of memory allocated for at least one of the requests in the given batch is less than that required for storage of a maximum output sequence length of the at least one machine learning model. The at least one processing device is further configured to execute the given batch utilizing the at least one machine learning model and to determine, during execution of the given batch utilizing the at least one machine learning model, whether one or more memory reallocation conditions have been triggered. The at least one processing device is further configured, responsive to determining that at least one of the one or more memory reallocation conditions has been triggered, to adjust the allocation of the memory to one or more of the requests in the given batch.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
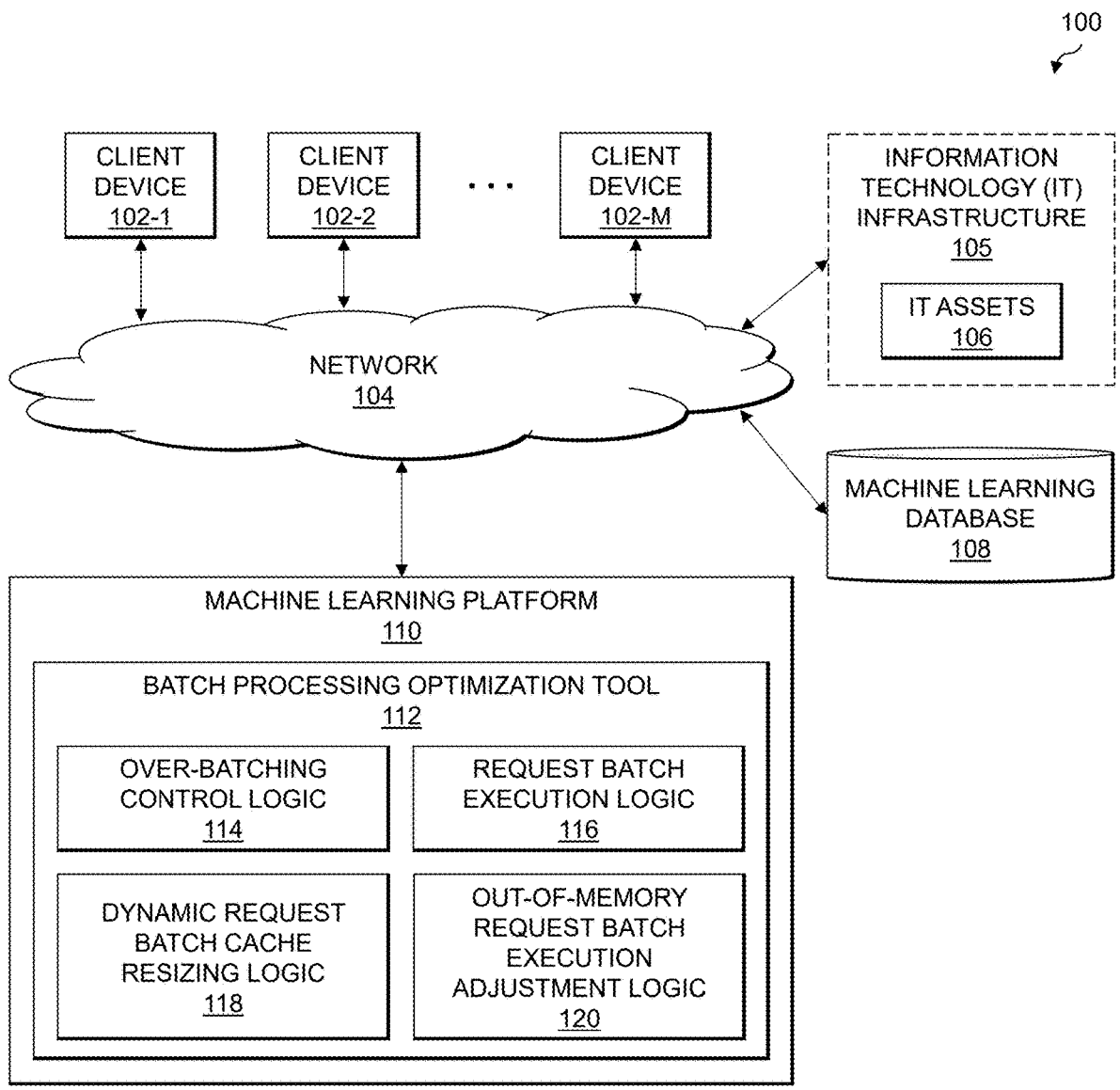
FIG. 1 is a block diagram of an information processing system configured for request over-batch processing for machine learning models in an illustrative embodiment.

FIG. 1 shows an information processing system 100 configured in accordance with an illustrative embodiment. The information processing system 100 is assumed to be built on at least one processing platform and provides functionality for request over-batch processing for machine learning models. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, a machine learning database 108, and a machine learning platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the machine learning platform 110 is used for an enterprise system. For example, an enterprise may subscribe to or otherwise utilize the machine learning platform 110 for processing of requests utilizing one or more machine learning models. The one or more machine learning models may comprise natural language processing (NLP) models such as large language models (LLMs). The requests may comprise, by way of example, input prompts that are to be processed using the LLMs. Each of the input prompts may comprise natural language text, with the LLMs processing those input prompts to output responses which also comprise natural language text. It should be appreciated, however, that various other types of requests (e.g., requests which do not include natural language text) may be processed depending on the type or configuration of the one or more machine learning models. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The machine learning database 108 is configured to store and record various information that is utilized by the machine learning platform 110. Such information may include, for example, user prompts (e.g., text-based, voice or audio-based using speech-to-text conversion, etc.), model parameters and configuration for one or more machine learning models (e.g., one or more LLMs), caches of inputs and outputs for one or more requests being processed using one or more machine learning models, etc. The machine learning database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the machine learning platform 110, as well as to support communication between the machine learning platform 110 and other related systems and devices not explicitly shown.

The machine learning platform 110 may be provided as a cloud service that is accessible by one or more of the client devices 102 to allow users thereof to generate requests that are processed using one or more machine learning models. In some embodiments, the client devices 102 are assumed to be associated with users of an enterprise, organization or other entity that seeks to utilize one or more machine learning models (e.g., LLMs). In some embodiments, the client devices 102 are utilized by members of the same enterprise, organization or other entity that operates the machine learning platform 110. In other embodiments, the client devices 102 are utilized by members of one or more enterprises, organizations or other entities different than the enterprise, organization or other entity that operates the machine learning platform 110 (e.g., a first enterprise provides support functionality for multiple different customers, businesses, etc.). Various other examples are possible.

In some embodiments, the client devices 102 and/or the IT assets 106 of the IT infrastructure 105 may implement host agents that are configured for automated transmission of information with the machine learning database 108 and the machine learning platform 110 regarding input prompts to one or more machine learning models (e.g., one or more LLMs) and output responses for such input prompts generated by the one or more machine learning models. It should be noted that a "host agent" as this term is generally used herein may comprise an automated entity, such as a software entity running on a processing device. Accordingly, a host agent need not be a human entity.

The machine learning platform 110 in the FIG. 1 embodiment is assumed to be implemented using at least one processing device. Each such processing device generally comprises at least one processor and an associated memory, and implements one or more functional modules or logic for controlling certain features of the machine learning platform 110. In the FIG. 1 embodiment, the machine learning platform 110 implements a batch processing optimization tool 112. The batch processing optimization tool 112 comprises over-batching control logic 114, request batch execution logic 116, dynamic request batch cache resizing logic 118, and out-of-memory (OOM) request batch execution adjustment logic 120. The over-batch control logic 114 is configured to determine, for a given batch to be executed utilizing at least one machine learning model (e.g., an LLM), a number of requests to include in the given batch based at least in part on an over-batching multiplier. The over-batching control logic 114 is further configured to allocate memory for processing the given batch utilizing the at least one machine learning model, where an amount of memory allocated for at least one of the requests in the given batch is less than that required for storage of a maximum output sequence length of the at least one machine learning model. The request batch execution logic 116 is configured to execute the given batch utilizing the at least one machine learning model. The request batch execution logic 116 is further configured to determine, during execution of the given batch utilizing the at least one machine learning model, whether one or more memory reallocation conditions have been triggered. The dynamic request batch cache resizing logic 118 is configured, responsive to detecting that at least one of the one or more memory reallocation conditions (e.g., that one or more requests in the given batch have finished execution or have been dropped) has been triggered, to adjust the allocation of the memory to one or more requests in the given batch (e.g., de-allocating memory previously allocated to the requests in the given batch that have finished execution or have been dropped and re-allocating such memory to other requests in the given batch). The OOM request batch execution adjustment logic 120 is configured, responsive to determining that at least one of the one or more memory reallocation conditions (e.g., one or more requests in the given batch are within a threshold of reaching an OOM condition) has been triggered, to adjust the allocation of the memory to one or more of the requests in the given batch (e.g., by selecting one or more requests in the given batch to drop, and re-allocating memory from the selected requests to other requests in the batch).

At least portions of the batch processing optimization tool 112, the over-batching control logic 114, the request batch execution logic 116, the dynamic request batch cache resizing logic 118 and the OOM request batch execution adjustment logic 120 may be implemented at least in part in the form of software that is stored in memory and executed by a processor.

It is to be appreciated that the particular arrangement of the client devices 102, the IT infrastructure 105, the machine learning database 108 and the machine learning platform 110 illustrated in the FIG. 1 embodiment is presented by way of example only, and alternative arrangements can be used in other embodiments. As discussed above, for example, the machine learning platform 110 (or portions of components thereof, such as one or more of the batch processing optimization tool 112, the over-batching control logic 114, the request batch execution logic 116, the dynamic request batch cache resizing logic 118 and the OOM request batch execution adjustment logic 120) may in some embodiments be implemented internal to the IT infrastructure 105.

The machine learning platform 110 and other portions of the information processing system 100, as will be described in further detail below, may be part of cloud infrastructure.

The machine learning platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the machine learning database 108 and the machine learning platform 110 or components thereof (e.g., the batch processing optimization tool 112, the over-batching control logic 114, the request batch execution logic 116, the dynamic request batch cache resizing logic 118 and the OOM request batch execution adjustment logic 120) may be implemented on respective distinct processing platforms, although numerous other arrangements are possible. For example, in some embodiments at least portions of the machine learning platform 110 and one or more of the client devices 102, the IT infrastructure 105, the IT assets 106 and/or the machine learning database 108 are implemented on the same processing platform. A given client device (e.g., 102-1) can therefore be implemented at least in part within at least one processing platform that implements at least a portion of the machine learning platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the machine learning database 108 and the machine learning platform 110, or portions or components thereof, to reside in different data centers. Numerous other distributed implementations are possible. The machine learning platform 110 can also be implemented in a distributed manner across multiple data centers.

Additional examples of processing platforms utilized to implement the machine learning platform 110 and other components of the information processing system 100 in illustrative embodiments will be described in more detail below in conjunction with FIGS. 10 and 11.

It is to be understood that the particular set of elements shown in FIG. 1 for request over-batch processing for machine learning models is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for request over-batch processing for a machine learning model will now be described in more detail with reference to the flow diagram of FIG. 2. It is to be understood that this particular process is only an example, and that additional or alternative processes for request over-batch processing for machine learning models may be used in other embodiments.

In this embodiment, the process includes steps 200 through 208. These steps are assumed to be performed by the machine learning platform 110 utilizing the batch processing optimization tool 112, the over-batching control logic 114, the request batch execution logic 116, the dynamic request batch cache resizing logic 118 and the OOM request batch execution adjustment logic 120. The process begins with step 200, determining, for a given batch to be executed utilizing at least one machine learning model, a number of requests to include in the given batch based at least in part on an over-batching multiplier. The at least one machine learning model may comprise an LLM, and the requests may comprise input prompts to the LLM.

In step 202, memory is allocated for processing the given batch of requests utilizing the at least one machine learning model. An amount of memory allocated for at least one of the requests in the given batch is less than that required for storage of a maximum output sequence length of the at least one machine learning model. The amount of memory allocated for each of the requests in the given batch may be a ratio of the maximum output sequence length of the at least one machine learning model to the over-batching multiplier. In some embodiments, the same amount of memory is allocated to each of the requests in the given batch. In other embodiments, different amounts of memory are allocated to different ones of the requests in the given batch (e.g., based at least in part on lengths of input prompts associated with the requests, priorities of the requests, etc.).

In step 204, the given batch is executed utilizing the at least one machine learning model. In step 206, a determination is made, during execution of the given batch utilizing the at least one machine learning model, whether one or more memory reallocation conditions have been triggered. Responsive to determining that at least one of the one or more memory reallocation conditions has been triggered, the allocation of the memory to one or more of the requests in the given batch is adjusted in step 208.

A given one of the one or more memory reallocation conditions may comprise determining that at least one of the requests in the given batch have finished execution, and adjusting the allocation of the memory to one or more of the requests in the given batch may comprise: deallocating a portion of the memory previously allocated to the at least one of the requests in the given batch that have finished execution; and re-allocating the portion of the memory previously allocated to the at least one of the requests in the given batch that have finished execution to one or more other ones of the requests in the given batch that have not finished execution. Re-allocating the portion of the memory previously allocated to the at least one of the requests in the given batch that have finished execution to the one or more other ones of the requests in the given batch that have not finished execution may comprise evenly distributing the portion of the memory previously allocated to the at least one of the requests in the given batch that have finished execution to the one or more other ones of the requests in the given batch that have not finished execution. In some embodiments, adjusting the allocation of the memory to one or more of the requests in the given batch is performed responsive to (i) determining that the at least one of the requests in the given batch have finished execution and (ii) determining that one or more other ones of the requests in the given batch that have not finished execution are within a designated threshold of reaching an OOM condition. In other embodiments, adjusting the allocation of the memory to one or more of the requests in the given batch is performed (i) responsive to determining that the at least one of the requests in the given batch have finished execution and (ii) proactively prior to determining that one or more other ones of the requests in the given batch that have not finished execution are within a designated threshold of reaching an OOM condition.

A given one of the one or more memory reallocation conditions may comprise determining that one or more of the requests in the given batch are within a designated threshold of reaching an OOM condition, and adjusting the allocation of the memory to one or more of the requests in the given batch may comprise: selecting one or more of the requests in the given batch to drop; deallocating a portion of the memory previously allocated to the selected one or more requests in the given batch; and re-allocating the portion of the memory previously allocated to the selected one or more requests in the given batch to one or more other requests in the given batch. Selecting one or more of the requests in the given batch to drop may comprise selecting at least one of the one or more requests that are within the designated threshold of reaching the OOM condition. The designated threshold of reaching the OOM condition may be determined based at least in part on a ratio of the maximum output sequence length of the at least one machine learning model to the over-batching multiplier. The FIG. 2 process may further include re-queuing at least one of the selected one or more requests in the given batch for execution in one or more other batches. The FIG. 2 process may also or alternatively include continuing execution of at least one of the selected one or more requests in the given batch without caching its associated output sequence in the memory.

Figure 2:
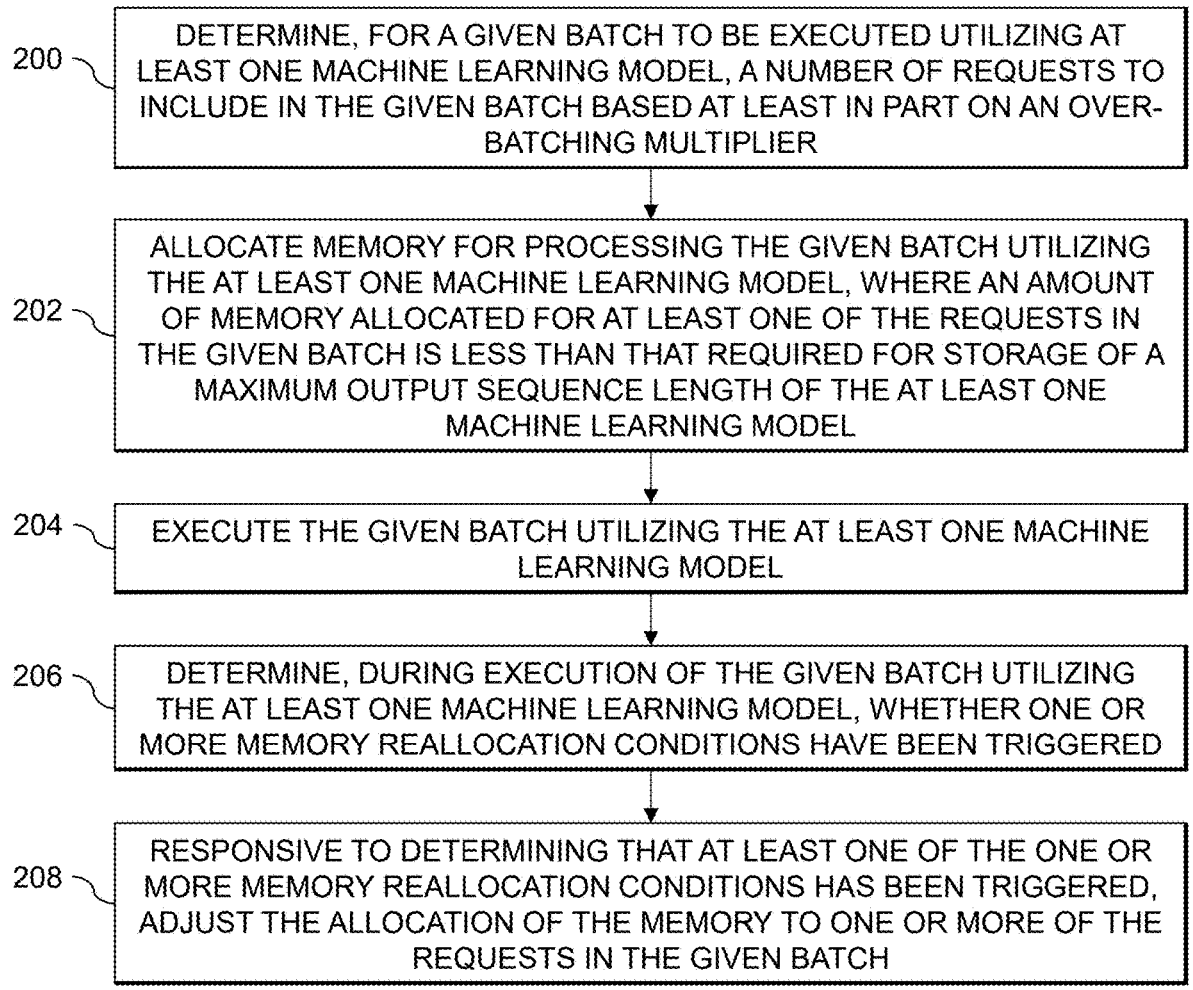
FIG. 2 is a flow diagram of an exemplary process for request over-batch processing for a machine learning model in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, multiple instances of the process can be performed in parallel with one another, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Large language models (LLMs) may be used for a wide variety of tasks. LLMs may be implemented using decoder-based transformer architectures. Due to the rapidly increasing demand for services provided using LLMs and other machine learning models which utilize decoder-based transformed architectures, there is a need for a more efficient way to serve more requests with as little resources as possible. In some cases, the characteristics of graphical processing units (GPUs) or other hardware accelerators are leveraged by batching multiple requests, which can greatly increase the overall throughput with very little latency penalties from a mini-batch point of view.

Batching, however, is ill-suited for the efficient processing of requests using machine learning models such as LLMs. This is due to various reasons, including that LLM requests vary on input and output size, with the output size usually being non-deterministic. Batches expect requests to be uniform on the input and output, leading to the need for padding and for continuing execution until the last request of a batch finishes. Further, LLM architectures use memory-intensive workloads, which only allow for small batches on real-world GPUs or other hardware accelerators. This leads to poor utilization, and it is not uncommon for models to run inference with as little as 1% utilization (e.g., of compute hardware utilization). In addition, due to the non-deterministic output size of different requests, an upper-bound maximum output may be used for LLMs (e.g., 2048 or 4092 token size limits). Batch size is limited by the memory available, and an upper limit on the maximum output is set to avoid OOM exceptions on GPUs or other hardware accelerators. By using this conservative approach, resources are underutilized since resources (e.g., memory) are over-reserved for the worst-case scenario (e.g., where every request in a batch will reach the upper-bound maximum output).

Thus, LLMs and other machine learning models which utilize decoder-based transformer or other model architectures may be bottlenecked by memory capacity and bandwidth. For example, inference for decoder-based transformer architectures may have a GPU utilization of less than 2% (e.g., floating-point operations per second (FLOPS)

utilization). A key-value (KV) cache is an important component in decoder-based transformer architectures that reduces computation needed at the expense of increasing memory requirements. The extra memory allocated for the KV cache may result in over-allocation of resources as, due to the uncertainty on the length of the response of an LLM, it is not possible to compute beforehand how much memory (and thus, how large of a KV cache) will be required for a specific request (e.g., beyond setting an upper limit). This issue is compounded when batching is applied. In the Generative Pre-Trained Transformer (GPT) family of LLMs, for example, the KV cache is responsible for a large portion of the total memory required. This adds to the issue that LLMs are heavily bottlenecked by memory, making compute hardware resources heavily underutilized.

Batching provides a way to improve resource utilization (e.g., compute hardware utilization) for LLMs, and for artificial intelligence (AI) and machine learning (ML) models generally. By batching requests on inference, parallelization of hardware is exploited to increase utilization. For example, the compute hardware utilization for GPT LLMs generally decreases as sequence length increases and increases as batch size increases. Due to the memory requirements of LLMs, however, it is not common to have large batch sizes. Most LLMs, for example, use a batch size of 1 to 8.

Thus, as a general rule, to increase resource utilization (e.g., compute hardware utilization in a GPU-based system), it is desired to set the batch size for LLM inference as large as the memory capacity of the system allows. This will depend on the specific configuration and LLM parameters size, and is typically limited to the single-digit range. For example, a GPT-3 175B LLM with a sequence length of 1000 tokens may use 4 gigabytes (GB) of KV cache memory per request, so every increase in the batch size increases the memory required by 4 GB. The problem remains, however, that the KV cache is memory capacity intensive which limits the batch size and resource utilization that can be achieved. Further, the inherent uncertainty of the response size of an LLM inference operation provides additional technical challenges linked with both batching and the KV cache. Thus, even within a batch inference, compute and memory resources may be wasted due to the overall difference in the sequence lengths of requests within a specific batch.

Illustrative embodiments provide technical solutions which allow LLMs and other machine learning models (e.g., including models which utilize transformer-based architectures) to better utilize resources during inference processing, thus providing better throughput and latency on a given hardware configuration. In some embodiments, the norm of being conservative with the generation output size of the requests to avoid OOM exceptions is broken. By embracing the possibility of OOM exceptions, and reacting accordingly to them, the technical solutions are able to increase the batch size (e.g., by implementing "over-batching") and the number of requests that can be processed at once, thus increasing hardware utilization and throughput, and improving latency for transformer batching inference. The technical solutions, in some embodiments, further provide functionality for managing impending OOM exceptions, such as through freeing and re-distributing memory resources as requests within a batch finish. Further, when an OOM exception is reached, the technical solutions apply different strategies to free extra memory (e.g., through request drop and re-execution functionality, through continuing execution with partial caching, etc.).

LLMs which utilize decoder-based transformer architectures have billions to hundreds of billions of parameters, which incurs a huge amount of computing FLOPS during inference, leading to a high operating cost and energy consumption. The challenges of serving rapidly increasing user demand can lead to poor user experience. This is the case even for LLMs which are backed by sophisticated and expansive cloud computing architectures. Users of LLM-based services thus see longer waiting times and poorer performance. The poorer performance, in some cases, is an indirect consequence of using lighter models in the backend to reduce resource usage.

Figure 3:
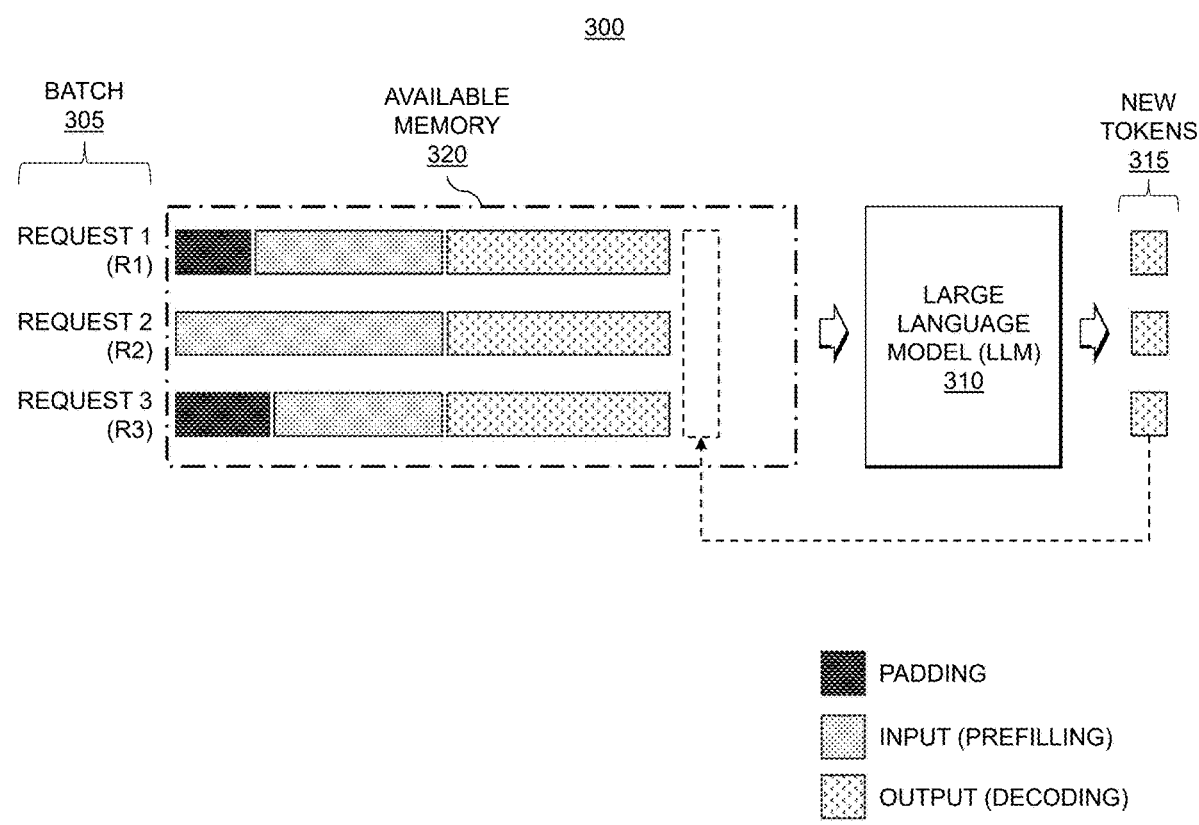
FIG. 3 shows request batch inference processing using a large language model in an illustrative embodiment.

As discussed above, batching user requests and sending them as mini-batches to an LLM is an effective way to increase hardware efficiency during inference operations. Putting more requests in one batch allows for completing each of the requests in the batch in one single forward pass (more precisely, in the LLM context, the mini-batch is processed as a generate call containing a series of forward passes). Batching requests works, in practice, by padding several input sequences (e.g., "prompts") to the same length (e.g., using left padding) and then feeding them to the LLM which processes the mini-batch as a whole Since the computing FLOPS are typically under-utilized during inference, batching more requests allows for better utilization of the FLOPS and, as a result, leads to lower average processing time for each request in the batch. The number of requests in a batch, however, is limited by the available memory and the conservative or worst case output length scenario. FIG. 3 illustrates a system flow 300 for execution of a batch 305 of requests utilizing an LLM 310. Here, the batch 305 includes three requests denoted R1, R2 and R3, which are padded (e.g., using left padding to align the sequences) and each include an input or "prefilling" portion and an output or "decoding" portion, which are discussed in further detail below. The batch 305 is processed by the LLM 310, which generates new tokens 315 that are appended to the output of each of the requests until processing is finished. The size of the batch 305 is limited by the available memory 320, where the available memory 320 is allocated for a worst case scenario which assumes that each of the requests in the batch 305 will continue processing until reaching the upper-bound maximum output of the LLM 310.

A decoder-based transformers execution for an LLM model may include an input or prefilling stage and an output or decoding stage. The prefilling stage is where the input prompt is processed as a whole by the layers of the LLM model before reaching the output layer. The input prompt processing "fills" the activation tensors and keeps them in memory (e.g., a KV cache). The prefilling stage is compute bound (e.g., as GPU or other compute hardware resources can be saturated). In the prefilling stage, the input prompt is tokenized, and all tokens in the tokenized prompt are processed at once on a single forward pass through the different layers, including word embedding, positional embedding, transformer layers 1 through N, and a language modeling (LM) head.

The decoding stage is where outputs are generated. Decoding refers to the autoregressive token generation process, where one new token is generated and appended to the prompt as input to the next step. Thus, the tokenized prompt (which is already prefilled as a result of the prefilling stage) and the generated tokens are passed through the different layers, including the word embedding, positional embedding, transformer layers 1 through N, and the LM head. In each forward pass through these layers, another token is generated and appended to the list of generated tokens that is used in the next pass through (along with the prefilled tokenized prompt). Thanks to the KV cache, the "prefilled" part does not need to be recomputed-only incremental computation is needed. The decoding stage is thus memory bandwidth bound.

On hardware accelerators, such as GPUs, the decoding stage tends to run several magnitudes slower than the prefilling stage, as the decoding stage is heavily memory bounded in comparison with the prefilling stage which is computationally bounded. This is a result of hardware accelerators having relatively high computation capabilities, but falling short in memory bandwidth and capacity in comparison with the resources needed to run the LLM inference.

LLM inference processing thus relies on parameters including batch size and the expected maximum length for a response. Batching may be used in AI/ML to further improve hardware resource utilization by aggregating several requests and executing them in parallel. The static character of batching, however, does not fit properly with the un-deterministic character of LLMs. The technical challenges for batching LLM requests thus include: that batching requires uniformly shaped request input, while transformer requests are variable, which leads to the need for "padding" or zero-information filling; that transformer requests have variable endings, while batching has a uniform ending across requests (as even if requests are returned once they finish, the overall execution of the batch continues), which leads to the need to either keep processing requests within a batch until all the requests finish or performing zero-information generation; and that overall transformers computation and memory profile are asymmetric while batching is inherently symmetrical.

Various padding strategies may be used for alignment in LLM inference processing, including left padding and pseudo-right padding approaches. In the left padding approach, there is no significant overhead in computing but there is increased KV cache memory usage. In the pseudo-right padding approach, there is advantageously no KV cache memory overhead, though there is more decoding computation as there are extra decoding steps determined according to the following equation: extra decoding steps=sum([inputsequences]−min(input sequences)). For the left padding approach, extra padding is added on the requests input, which increases the memory size (e.g., the size of the KV cache) and the bandwidth required for processing a batch.

Due to the nature of AI/ML models such as LLMs, the output token size cannot be computed beforehand (beyond limiting the maximum output size that an LLM can produce). This means that requests can output responses that vary in size and in computation time. Since the LLM inference/request output size cannot be computed beforehand, this leads to unpredictable computing time. Further, individual request execution time variability may impact batching performance. Traditional batch execution is ill-suited for LLM inference, as significant resources may be wasted due to the unpredictable difference on execution time and resources among the requests in a batch. Even if several requests within a batch being executed have finished and returned their results, the overall batch will keep executing until the last request in the batch has finished. This wastes resources by processing the data of the already-finished requests in the batch.

Figure 4:
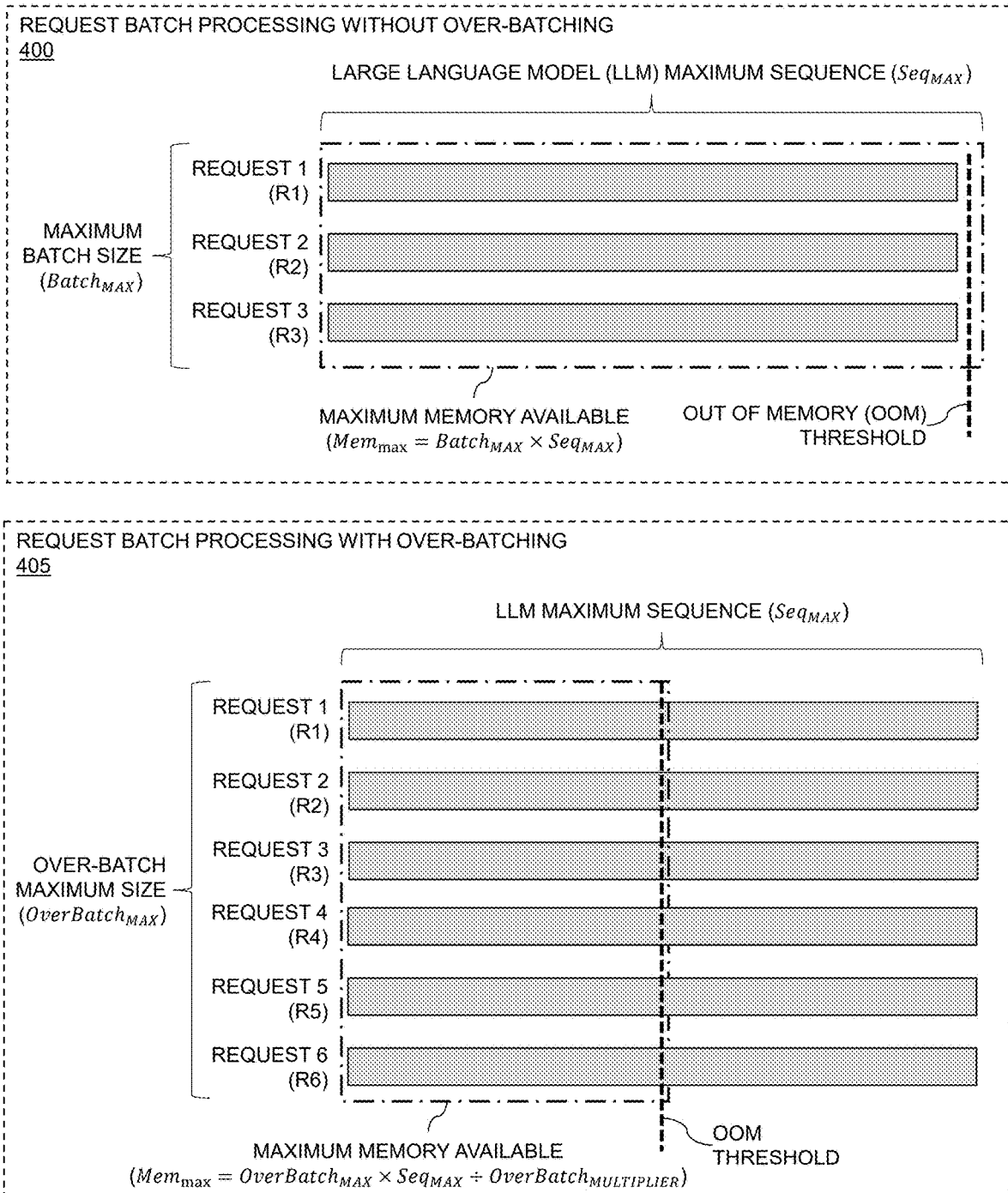
FIG. 4 shows an example of execution of a set of requests in inference processing for a machine learning model with and without use of over-batching functionality in an illustrative embodiment.

Illustrative embodiments provide technical solutions for implementing "over-batching" functionality, which increases the number of requests processed in a batch by allowing for the possibility of OOM exceptions. Over-batching can increase the effective hardware utilization, as well as increase throughput and decrease latency of the overall system. FIG. 4 shows example of request batch processing without over-batching 400 and with over-batching 405. The request batch processing without over-batching 400 includes processing in which each of the requests R1, R2 and R3 in the batch is allocated an amount of the available memory that is based on the LLM maximum sequence length, $Seq_{MAX}$. The maximum batch size, $Batch_{MAX}$ is thus determined by dividing the amount of available memory, $Mem_{max}$, by the LLM maximum sequence length $Seq_{MAX}$ ($Batch_{MAX}=Mem_{max} \div Seq_{MAX}$). Assume, for example, that $Seq_{MAX}=200$ and that $Mem_{max}=600$, such that $Batch_{MAX}=3$. In the request batch processing without over-batching 400, each of the requests R1, R2 and R3 is allocated enough memory such that an OOM threshold will not be reached.

In the request batch processing with over-batching 405, a larger number of requests is included in the batch by reducing the amount of memory which is allocated to each of the requests in the batch (e.g., such that the there is a chance of one or more of the requests hitting the OOM threshold). Here, the LLM maximum sequence length, $Seq_{MAX}$, is the same, as is the amount of available memory, $Mem_{max}$. The maximum size of the batch, $OverBatch_{MAX}$, however, is further based on an over-batching multiplier, $OverBatch_{MULTIPLIER}$ and may be computed according to $Batch_{MAX}=OverBatch_{MULTIPLIER} \times Mem_{max} \div Seq_{MAX}$. Continuing with the example above where $Seq_{MAX}=200$ and $Mem_{max}=600$, and with $OverBatch_{MULTIPLIER}=2$, $OverBatch_{MAX}=6$. The request batch processing with over-batching 405 has the potential for one or more of the requests (denoted R1-R6) in the batch reaching the OOM threshold. The over-batching functionality thus further provides mechanisms for solving potential OOM issues. In some embodiments, a mechanism is provided for remapping and resizing the memory (e.g., which is allocated to the different requests in the batch) when requests within the batch compute. When a request within a batch finishes execution, its result is returned and its memory is deallocated and distributed among the ongoing requests in the batch, thus increasing the OOM threshold and reducing the chances of the ongoing requests experiencing OOM issues. In some embodiments, a mechanism is also or alternatively provided which, when a request reaches the OOM threshold, applies processing to address the OOM issue. Such processing may include, for example, implementing request drop re-queuing functionality (e.g., stopping one or more requests which have reached the OOM threshold and re-queuing them for execution in a subsequent batch, allowing additional memory resources to be deallocated and distributed among the other ongoing requests in the batch), continuing execution with partial caching, etc.

LLMs and other types of machine learning models which are based on transformer-based or other architectures are typically memory-bound during inference. Due to the nature of LLMs, the number of requests that can be batched together is seriously limited by the memory capacity, making computational resources (e.g., GPUs or other hardware accelerators) poorly utilized. Further, the input and output sequence lengths of LLM requests are unevenly distributed. The decoding time and memory required by an LLM is directly related to the length of the output sequence that is to be generated. The output length, however, cannot be known before completing the request (apart from the LLM setting an upper-bound on the maximum output sequence length), such that the output lengths of requests which are batched together may be highly different. Due to this issue, batches tend to be conservative in size, so that they can fit in memory the maximum output sequence of the LLM which can potentially be generated by a request. Thus, conventional approaches for batch execution are ill-suited for LLM inference, as significant resources may be wasted due to the unpredictable difference on execution time and resources among the requests in a batch.

The technical solutions described herein provide functionality for over-batching which solves these and other technical challenges. The over-batching functionality utilizes a batch size that is beyond the OOM safe limit (e.g., which would be imposed on a batching pipeline in a conventional approach). The over-batching functionality further enables monitoring of requests within a batch to determine when requests are nearing an OOM condition or threshold, and provides dynamic request batch cache resizing logic and OOM request batch execution adjustment logic for handling such OOM conditions. The dynamic request batch cache resizing logic is configured to remap and resize a cache (e.g., of memory allocated to different requests) based on the actual state of the batching process. This may include resizing, increasing or decreasing the amount of requests allowed in a batch as well as remapping the already processed tokens of an ongoing batch to maintain the spatial continuity of each element after resizing. The OOM request batch execution adjustment logic is configured to trigger mechanisms for handling OOM conditions when one or more requests have exhausted their allocated memory and trigger an OOM exception.

On system initialization, an over-batching multiplier (OverBatch$_{MULTIPLIER}$) is set, which defines the relationship between the maximum safe or "conservative" batch size allowed for a specific model architecture, configuration and system hardware. The conservative batch size is one which allocates memory to the requests within a batch such that no request will trigger an OOM exception, as illustrated by the request batch processing without over-batching 400 shown in FIG. 4. The over-batching multiplier may be initialized to a default or recommended value, which an end-user or operator of the LLM or other machine learning model may adjust as desired. For example, if the maximum conservative batch size allowed for a particular model architecture, configuration and system hardware is 8 and the over-batching multiplier is 2, the effective batch size is set to 16 and the OOM threshold will fall to half the maximum allowed sequence length of the system, as illustrated by the request batch processing with over-batching 405 shown in FIG. 4.

Once the system starts processing the batch and generating new tokens, the over-batching functionality will check for the completion of requests and whether any requests are nearing or have reached the OOM threshold. When a request is finished, resizing and remapping (e.g., the dynamic request batch cache resizing logic) is activated. In some embodiments, the resizing and remapping is activated on the spot or automatically when a request has finished. In other embodiments, the resizing and remapping is activated on a delay where the actual resizing and remapping of the memory happens just right before it is needed like a dynamic array structure.

If one or more requests are nearing or reach the OOM threshold and the resizing and remapping is either not utilized or not sufficient to alleviate the OOM condition, then one or more OOM mitigation strategies are implemented (e.g., the OOM request batch execution adjustment logic is triggered). This may include, for example, dropping one or more requests randomly and re-queuing them for execution in a subsequent batch. For requests which are dropped, the tokens which are generated before the drop occurs may be moved and concatenated as part of the request's input sequence when executing in the subsequent batch such that the next time the request is executed, it can start from the last output token executed on the previous batch (e.g., the whole output sequence does not need to be computed again). Another OOM mitigation strategy is to continue execution of requests with partial caching.

Figure 5:
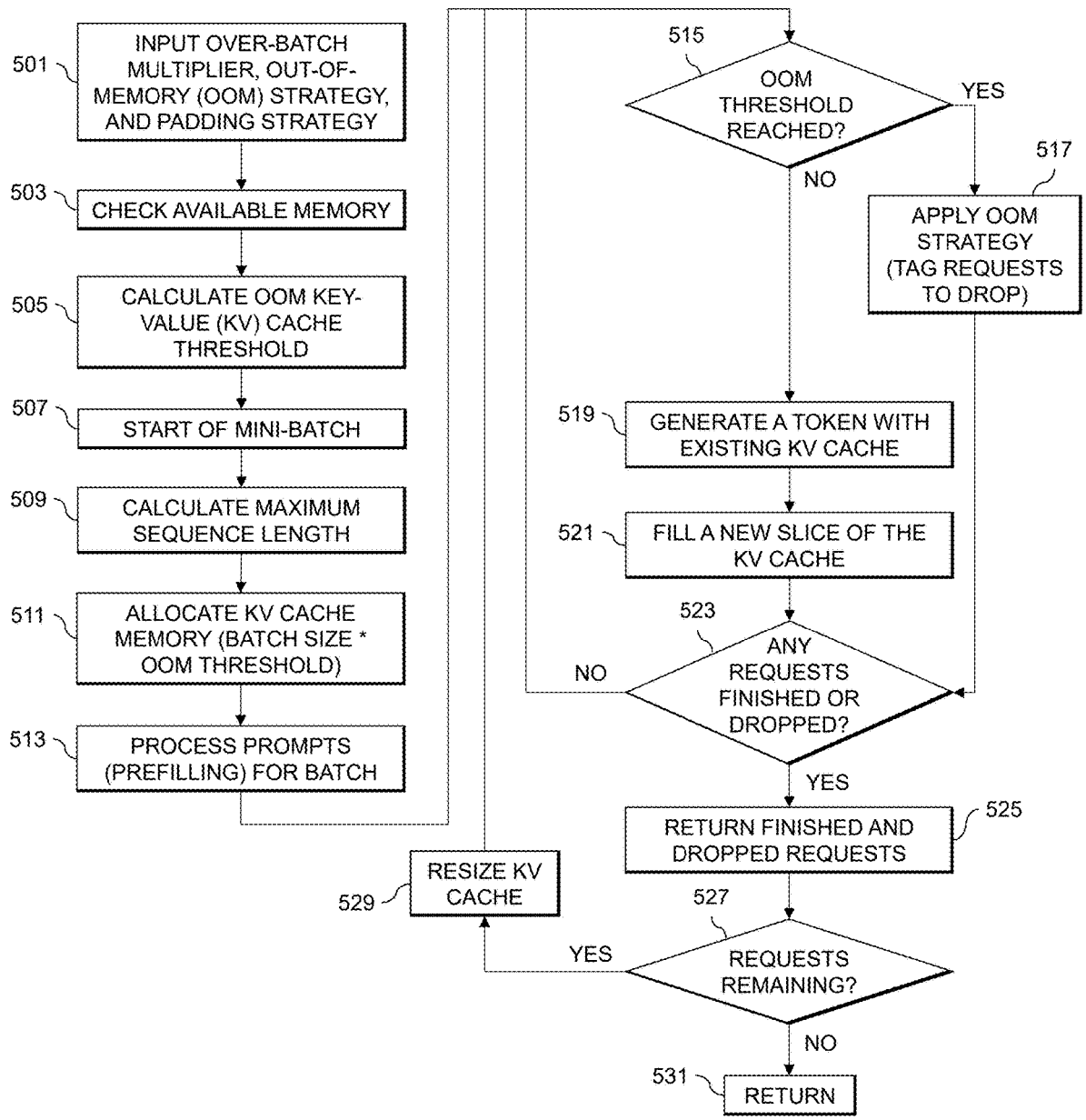
FIG. 5 shows a system flow for over-batching of requests in inference processing for a machine learning model in an illustrative embodiment.

FIG. 5 shows a process flow 500 for implementing over-batching functionality. The process flow 500 begins with inputting an over-batch multiplier, an OOM strategy and a padding strategy in block 501. In block 503, available memory is checked. In block 505, an OOM KV cache threshold is calculated. In block 507, a batch including at least a subset of a set of requests (e.g., for performing LLM or other AI/ML inference) is started. The batch may be referred to as a "mini-batch" as it assumes that the set of requests cannot be processed in a single batch, such that multiple batches will be required for processing. It should be appreciated, however, that this is not a requirement—the entire set of requests may be processed in a single batch, additional requests may be received during processing of a batch, etc. In block 509, a maximum sequence length (Seq$_{MAX}$) for the LLM is calculated. In block 511, a KV cache is allocated in memory, where the size of the KV cache is the batch size multiplied by the OOM threshold. The batch size, as discussed above with respect to FIG. 4, may be determined by dividing the amount of available memory (Mem$_{max}$) by the calculated maximum sequence length (Seq$_{MAX}$), and multiplying this by the over-batch multiplier (OverBatch$_{MULTIPLIER}$). The OOM threshold is determined by dividing the maximum sequence length (Seq$_{MAX}$) by the over-batch multiplier (OverBatch$_{MULTIPLIER}$).

In block 513, input prompts (e.g., user prompts in an LLM model) are processed for the batch. Such input prompt processing is an example of the prefilling stage of processing. In block 515, a determination is made as to whether the OOM threshold is reached for any of the requests in the batch. If the result of the block 515 determination is yes, then the OOM strategy specified in block 501 is applied in block 517 (e.g., to tag one or more requests to drop), and the process flow 500 proceeds to block 523. If the result of the block 515 determination is no, then a token is generated with the existing KV cache in block 519. The generated token is then filled in a new slice of the KV cache in block 521. In block 523, a determination is made as to whether any of the requests in the batch have finished or have been tagged to be dropped. If the result of the block 523 determination is no, the process flow 500 returns to block 515. If the result of the block 523 determination is yes, the process flow 500 proceeds to block 525 where the finished and dropped requests are returned. In block 527, a determination is made as to whether there are any requests remaining in the batch. If the result of the block 527 determination is yes, the process flow 500 proceeds to block 529 where the KV cache is resized (e.g., be deallocating memory from the finished and dropped requests and remapping that memory to the remaining requests in the batch). Following block 529, the process flow 500 returns to block 515. If the result of the block 527 determination is no, the results of the batch are returned in block 531.

Figure 6:
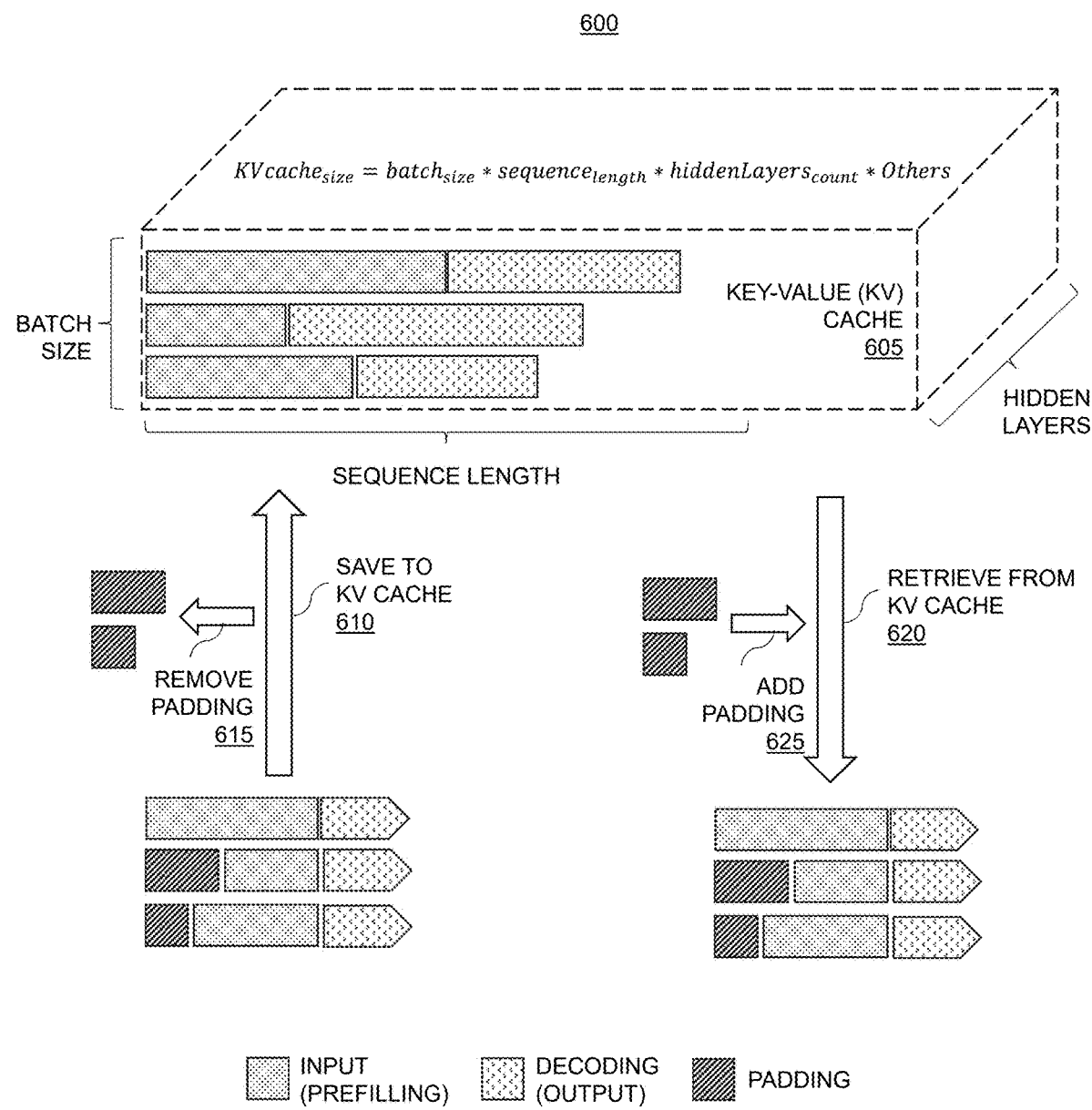
FIG. 6 shows a system flow for asymmetric pad-less caching in inference processing for a machine learning model in an illustrative embodiment.

The over-batching functionality described herein is compatible with various padding strategies, including left or right alignment padding. The over-batching functionality, in some embodiments, provides improved performance by leveraging an advanced padding strategy. The advanced padding strategy may be viewed as a "pad-less" approach, which utilizes an asymmetric pad-less cache that from one side removes the need to store the padding in memory (e.g., in the KV cache) by subtracting the padding before storing it in memory and adding it when the information is retrieved from memory. This approach is illustrated in FIG. 6, which shows an asymmetric pad-less caching system flow 600, where a KV cache 605 has a size (KVcache$_{size}$) that is determined according to the batch size (batch$_{size}$), sequence length (sequence$_{length}$) and the number of hidden layers (hiddenLayers$_{count}$):

$$KVcache_{size}=batch_{size}*sequence_{length}*hiddenLayers_{count}*Others$$

where Others represents a factor for other potential data that is stored in the KV cache, which may vary between different implementations. In some cases, it is expected that the Others factor is negligible and will not significantly impact the size of the KV cache (KVcache$_{size}$). In other cases, depending on how the LLM and KV cache are implemented, the Others factor may have a more significant impact. When data is saved to the KV cache 605 in block 610, padding is removed in block 615. When data is retrieved from the KV cache 605 in block 620, the padding is added in block 625.

Figure 7:
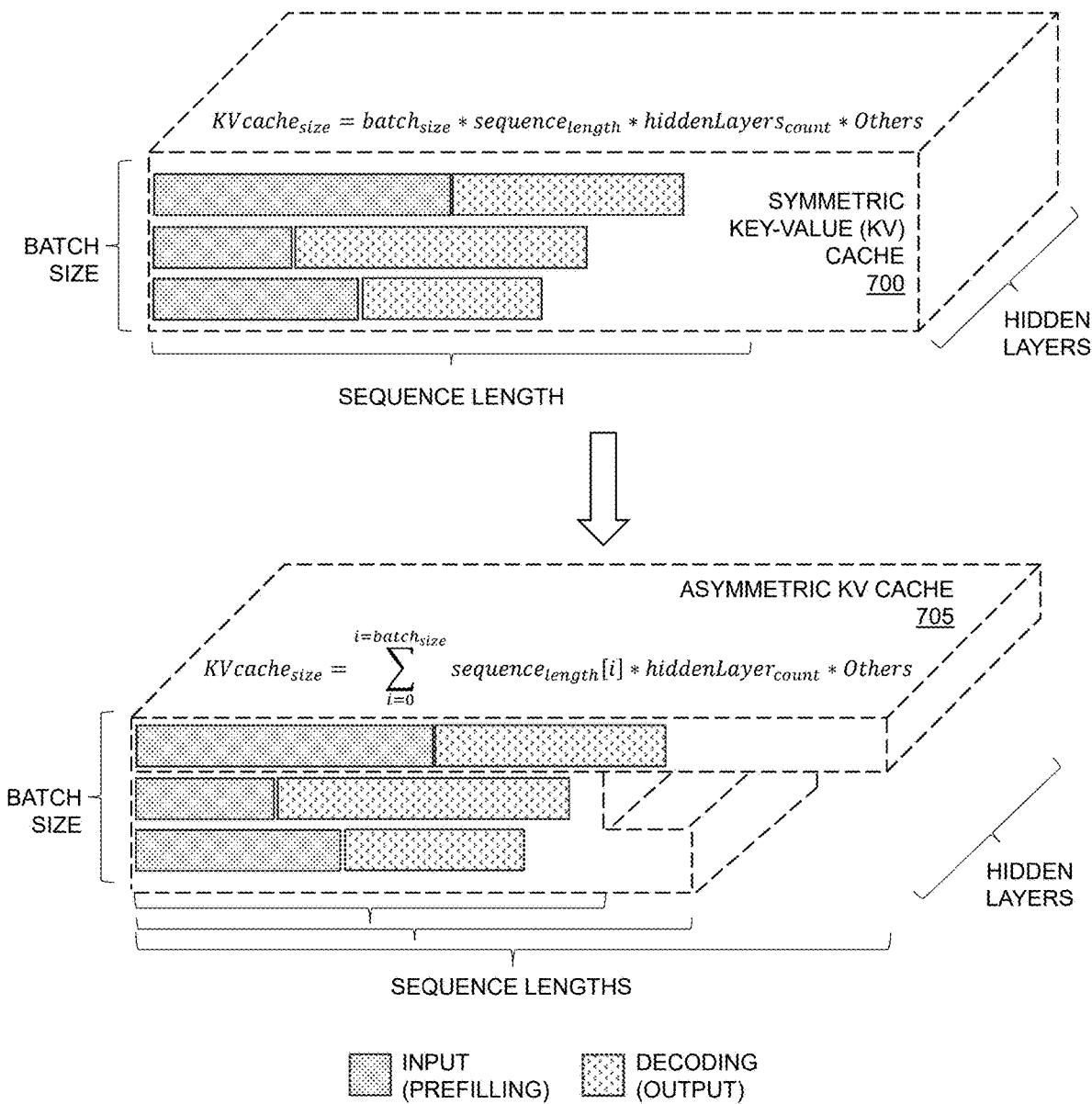
FIG. 7 shows examples of symmetric and asymmetric key-value caches used in inference processing for a machine learning model in an illustrative embodiment.

The asymmetric pad-less cache approach further allows for allocating the cache asymmetrically for the requests stored therein, as each request may have a different input size and all the requests in a batch generate tokens at the same pace. This avoids the situation where some requests fill the cache earlier than others. Such asymmetric cache allocation is illustrated in FIG. 7. FIG. 7 shows a symmetric KV cache 700 and an asymmetric KV cache 705. The symmetric KV cache 700 has a size that is determined by the batch size, the sequence length of the longest request in the batch, and the hidden layers as described above with respect to FIG. 6. The asymmetric KV cache 705, in contrast, allocates the cache size (KVcache$_{size}$) asymmetrically for the different requests in the batch based on the batch size (batch$_{size}$), the differing sequence lengths (sequence$_{length}$[i]), and the number of hidden layers (hiddenLayer$_{count}$):

$$KV\ cache_{size} = \sum_{i=0}^{i=batch_{size}} sequence_{length}[i] * hiddenLayer_{count} * Others$$

where Others again represents a factor for other potential data that is stored in the KV cache, which may vary between different implementations. The asymmetric KV cache 705 provides space savings relative to the symmetric KV cache 700.

Figure 8:
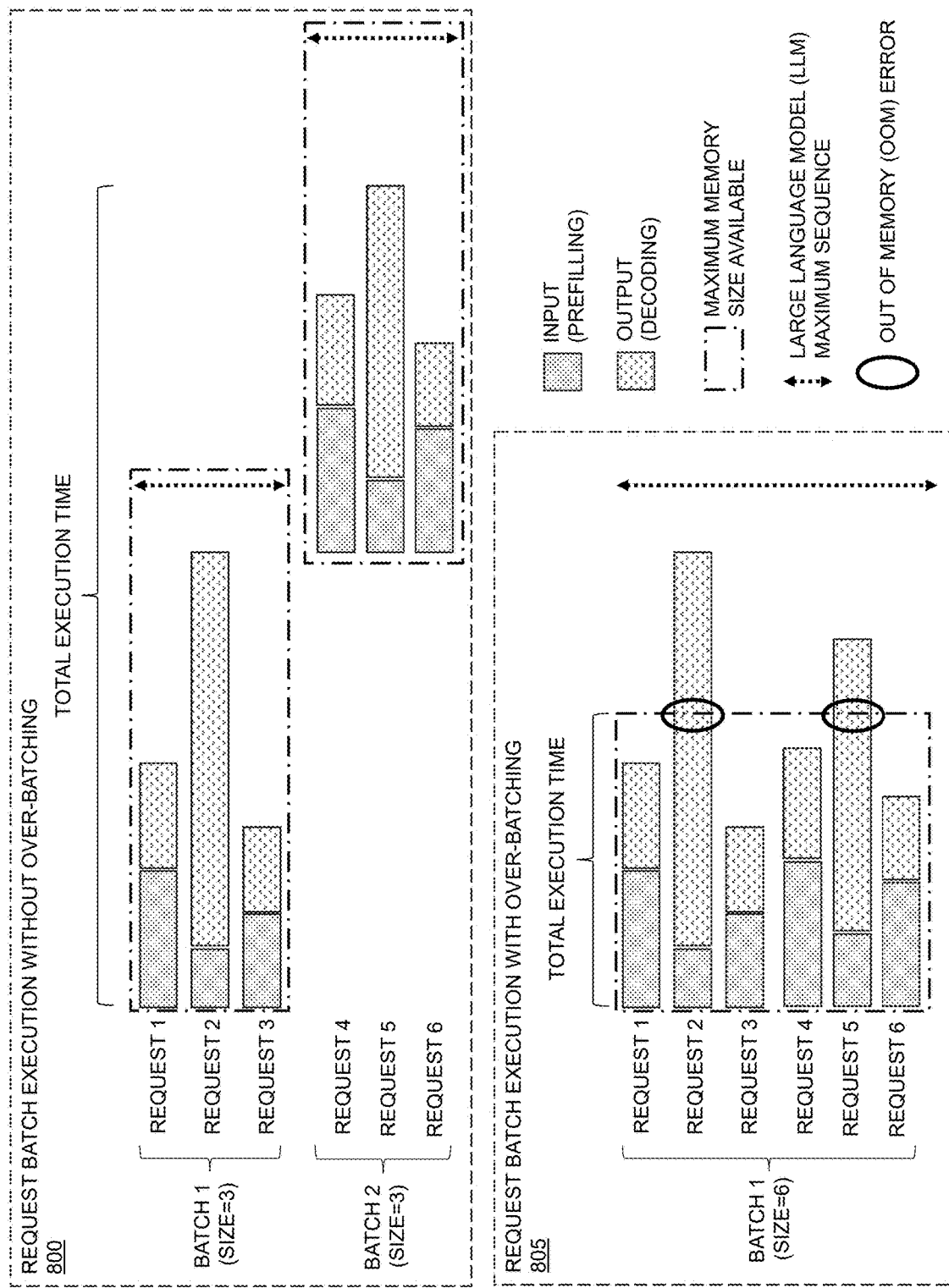
FIG. 8 shows another example of execution of a set of requests in inference processing for a machine learning model with and without use of over-batching functionality in an illustrative embodiment.

FIG. 8 shows examples of request batch execution of a set of six requests denoted R1-R6 without and with overbatching. The request batch execution without over-batching 800 includes two batches, each of size 3. The first request batch includes requests R1-R3, and involves allocating available memory based on the worst case scenario (e.g., where each of the requests is allocated enough memory for the maximum sequence length of the LLM model). The second request batch, which includes requests R4-R6, is executed following completion of the last request in the first request batch (request R2). Again, in the second request batch, the available memory is allocated based on the worst case scenario (e.g., where each of the requests are allocated enough memory for the maximum sequence length of the LLM model). In the request batch execution without overbatching 800, none of the requests R1-R6 will reach an OOM error. The request batch execution with over-batching 805 includes processing the requests R1-R6 in a single batch. Here, each of the requests is allocated an amount of memory which is less than the LLM maximum sequence length. In this example, the over-batching multiplier is 2, and each of the requests is allocated an amount of memory corresponding to ½ of the LLM maximum sequence length. Here, two of the requests (R2 and R5) experience an OOM error. These requests may be handled using a specified OOM strategy (e.g., random request dropping and re-execution in a subsequent batch, continuing execution with partial caching, etc.). The request batch execution with over-batching 805 utilizes the pad-less cache padding strategy illustrated in FIG. 6.

Figure 9A:
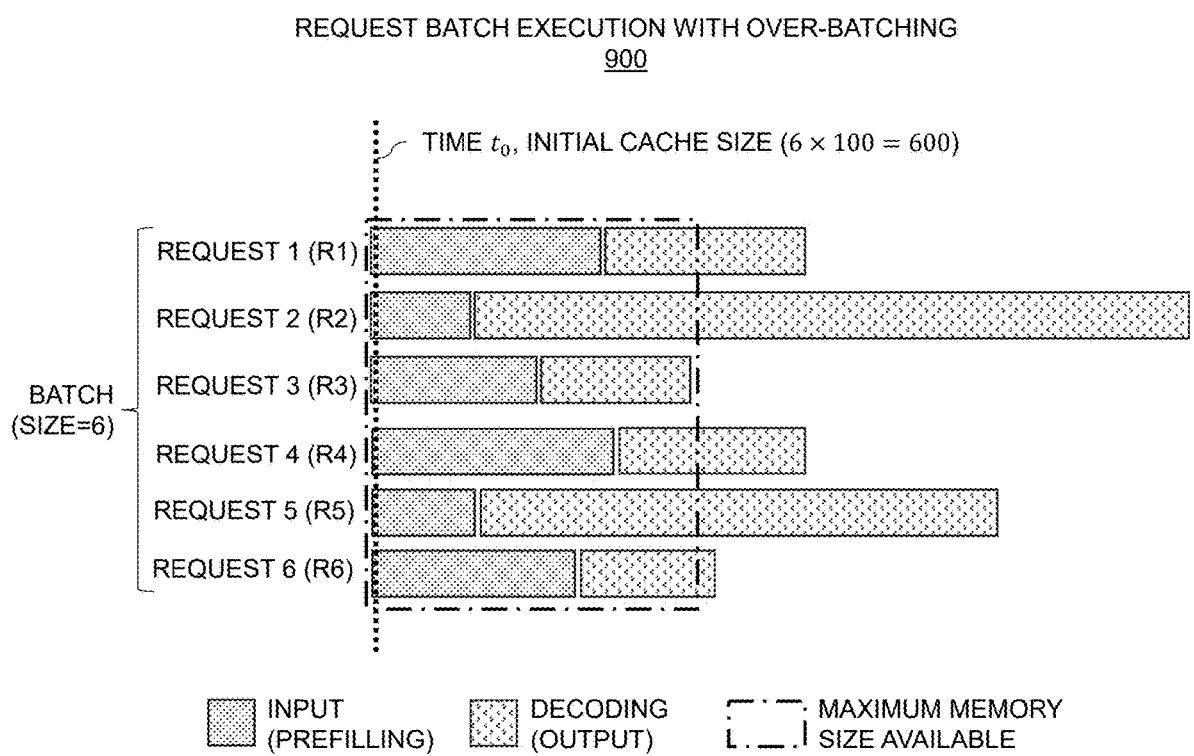
FIGS. 9A-9D show another example of execution of a set of requests in inference processing for a machine learning model utilizing over-batching and dynamic cache resizing in an illustrative embodiment.
Figure 9B:
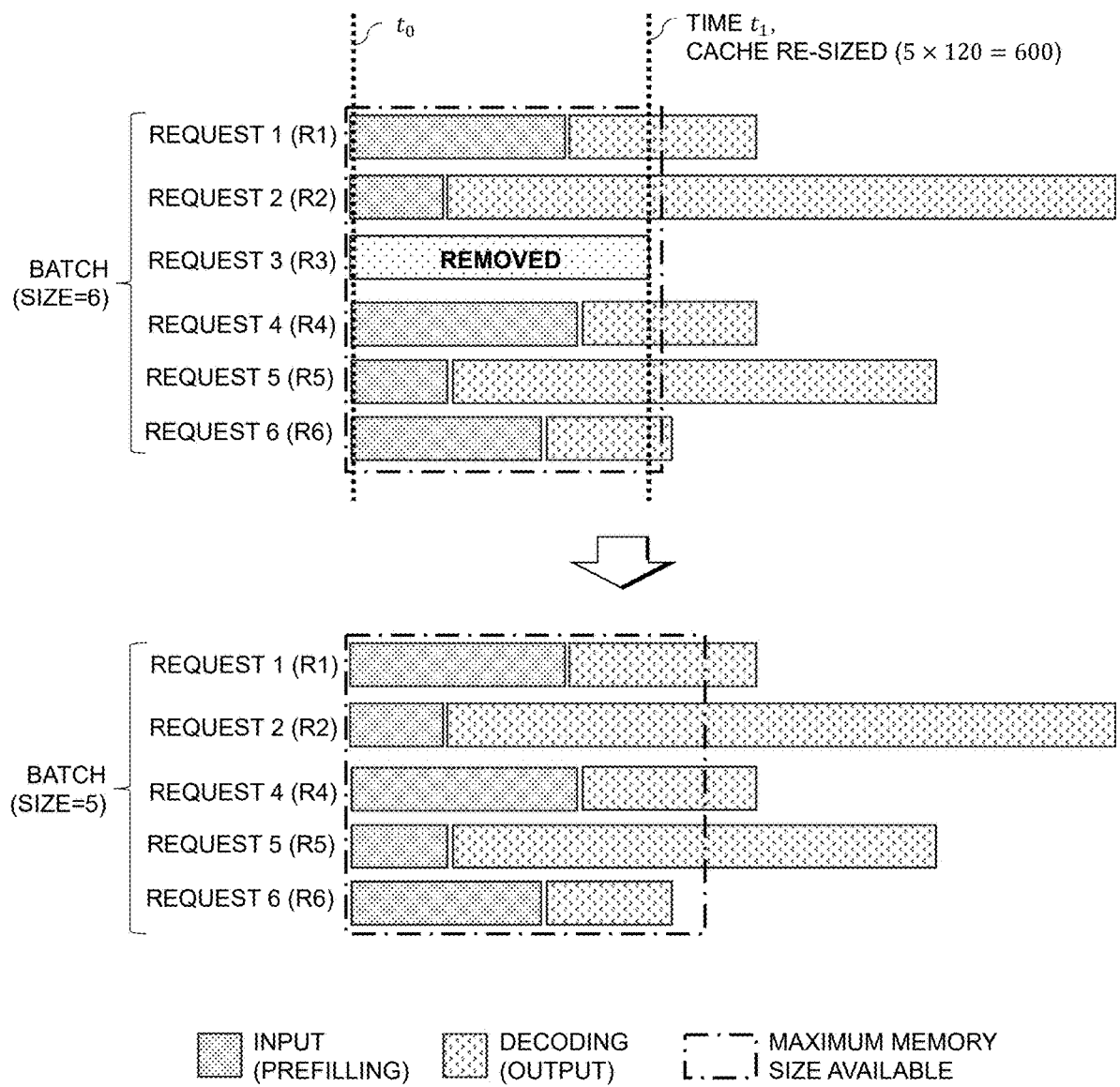
Figure 9C:
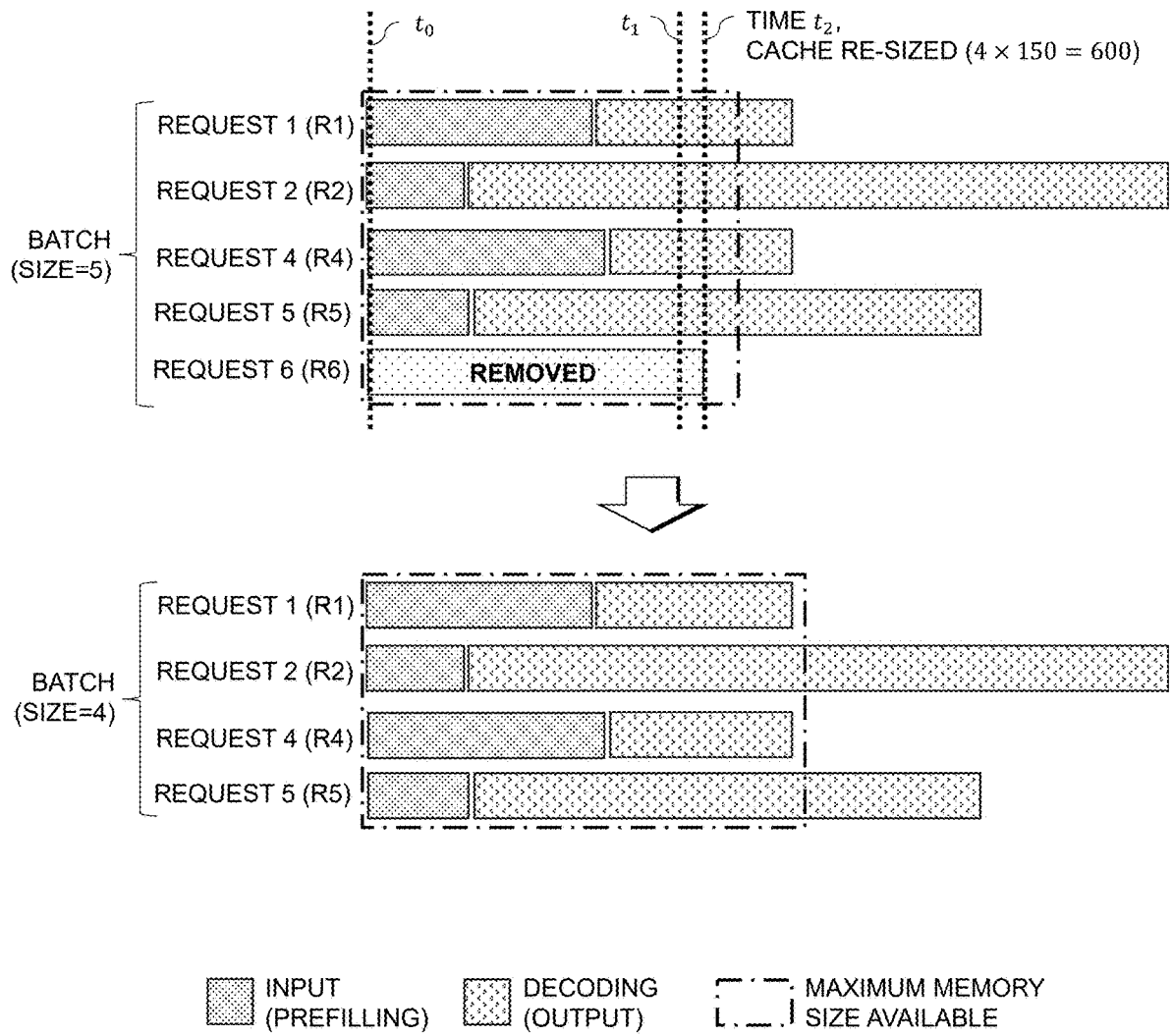
Figure 9D:
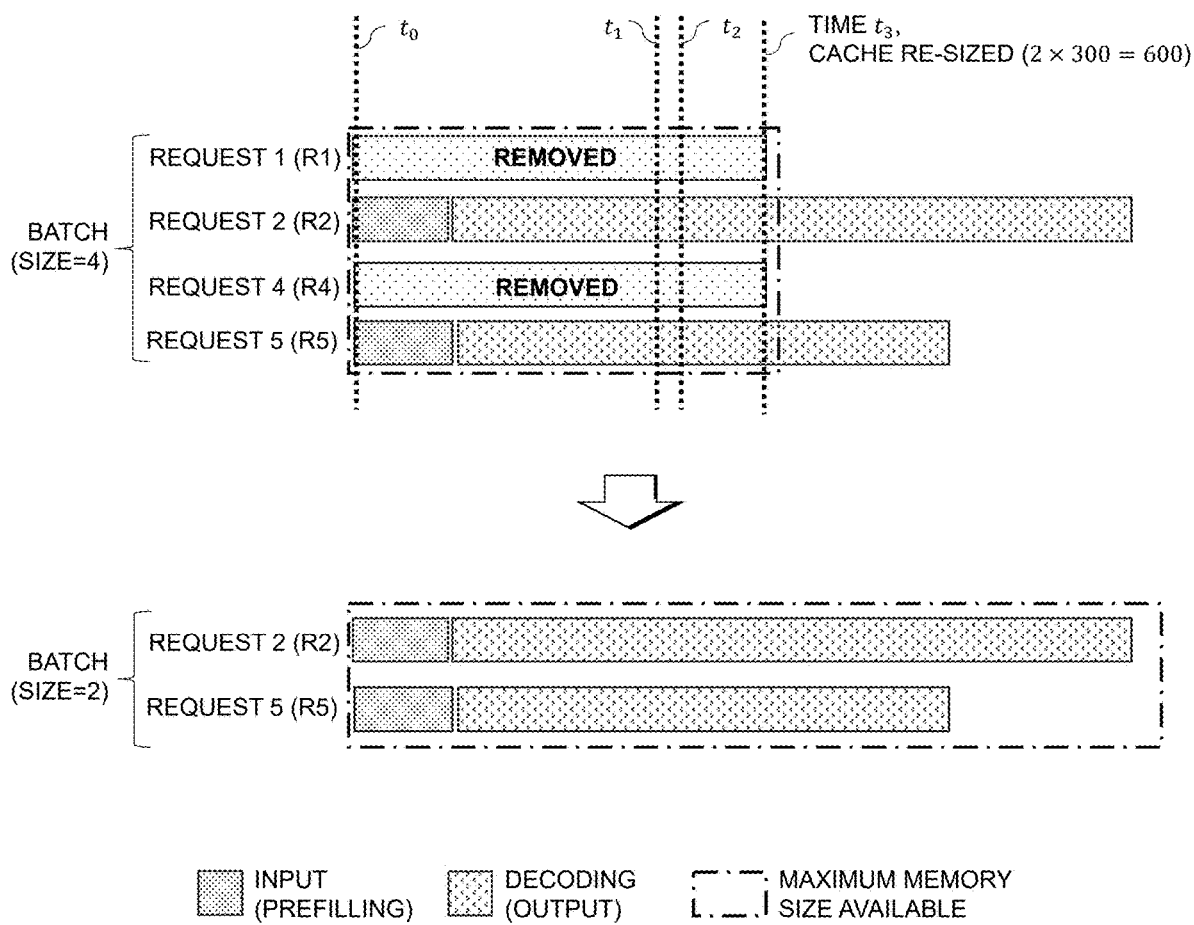

FIGS. 9A-9D show an example of request batch execution with over-batching 900, illustrating resizing and remapping of the available memory during the over-batching execution. In the example of FIGS. 9A-9D, it is assumed that the amount of available memory corresponds to a sequence length of 600 tokens, and that the LLM has a maximum sequence length of 200 tokens. As shown in FIG. 9A at time $t_0$, the initial KV cache size allocated the available memory equally among six requests denoted R1-R6 (e.g., 100 tokens each). As shown in FIG. 9B, at time $t_1$ the request R3 has finished execution and is removed. The memory space allocated to the request R3 (e.g., 100 tokens) is deallocated and then re-allocated among the remaining five requests R1, R2 and R4-R6 (e.g., such that the KV cache is resized to 120 tokens for each of the remaining five requests). As shown in FIG. 9C, at time $t_2$, the request R6 has finished execution and is removed. The memory space allocated to the request R6 (e.g., 120 tokens) is deallocated and then re-allocated among the remaining four requests R1, R2, R4 and R5 (e.g., such that the KV cache is resized to 150 tokens for each of the remaining four requests). As shown in FIG. 9D, at time $t_3$, the requests R1 and R4 have finished execution and are removed. The memory space allocated to the requests R1 and R4 (e.g., 150 tokens each) is deallocated and then re-allocated among the remaining two requests R2 and R5 (e.g., such that the KV cache is resized to 300 tokens for each of the remaining two requests).

The technical solutions described herein provide overbatching functionality which allows for increasing the batch size beyond "safe" limits on LLM or other machine learning model inference, along with functionality for reducing the impact of OOM exceptions by preemptively remapping and resizing the memory allocated to different requests within batches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for over-batch processing for machine learning models will now be described in greater detail with reference to FIGS. 10 and 11. Although described in the context of system 100, these platforms may also be used to implement at least portions of other information processing systems in other embodiments.

Figure 10:
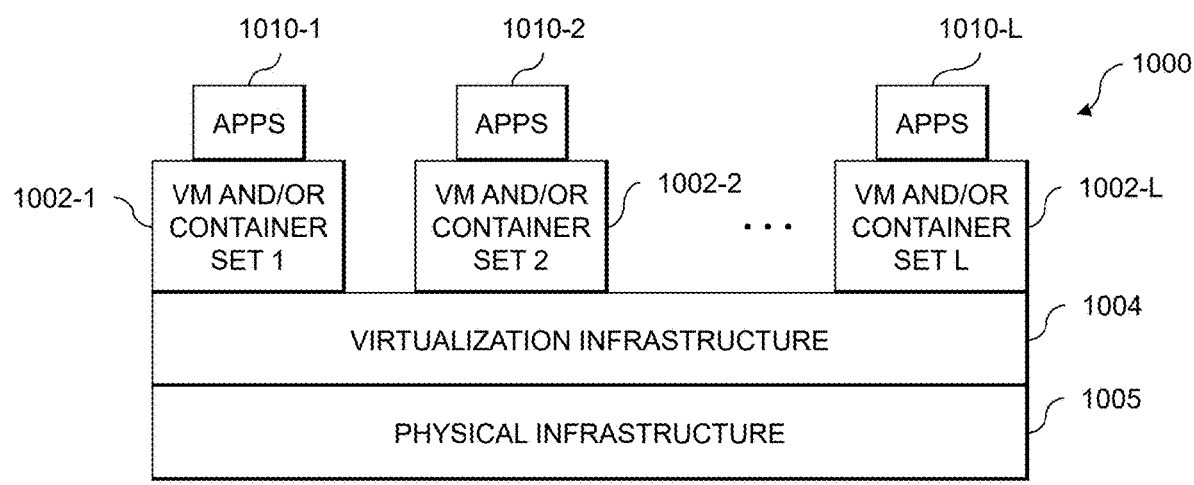
FIGS. 10 and 11 show examples of processing platforms that may be utilized to implement at least a portion of an information processing system in illustrative embodiments.
Figure 11:
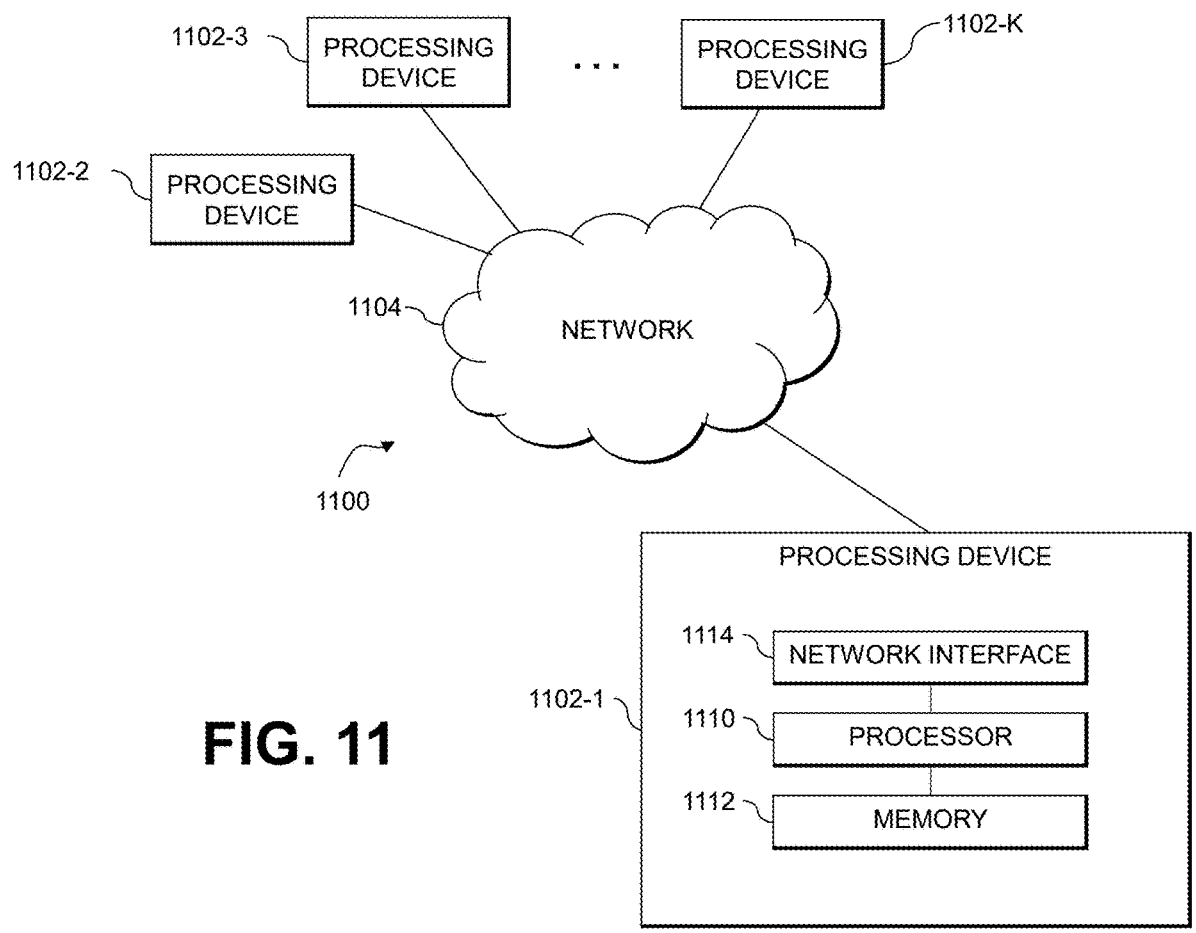

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for over-batch processing for machine learning models as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to determine, for a given batch to be executed utilizing at least one machine learning model, a number of requests to include in the given batch based at least in part on an over-batching multiplier;
to allocate memory for processing the given batch utilizing the at least one machine learning model, wherein an amount of memory allocated for at least one of the requests in the given batch is less than that required for storage of a maximum output sequence length of the at least one machine learning model;
to execute the given batch utilizing the at least one machine learning model;
to determine, during execution of the given batch utilizing the at least one machine learning model, whether one or more memory reallocation conditions have been triggered; and
responsive to determining that at least one of the one or more memory reallocation conditions has been triggered, to adjust the allocation of the memory to one or more of the requests in the given batch.

2. The apparatus of claim 1 wherein the at least one machine learning model comprises a large language model.

3. The apparatus of claim 1 wherein the amount of memory allocated for each of the requests in the given batch is a ratio of the maximum output sequence length of the at least one machine learning model to the over-batching multiplier.

4. The apparatus of claim 1 wherein a given one of the one or more memory reallocation conditions comprises determining that at least one of the requests in the given batch have finished execution.

5. The apparatus of claim 4 wherein adjusting the allocation of the memory to one or more of the requests in the given batch comprises:
deallocating a portion of the memory previously allocated to said at least one of the requests in the given batch that have finished execution; and
re-allocating the portion of the memory previously allocated to said at least one of the requests in the given batch that have finished execution to one or more other ones of the requests in the given batch that have not finished execution.

6. The apparatus of claim 5 wherein re-allocating the portion of the memory previously allocated to said at least one of the requests in the given batch that have finished execution to the one or more other ones of the requests in the given batch that have not finished execution comprises evenly distributing the portion of the memory previously allocated to said at least one of the requests in the given batch that have finished execution to the one or more other ones of the requests in the given batch that have not finished execution.

7. The apparatus of claim 4 wherein adjusting the allocation of the memory to one or more of the requests in the given batch is performed responsive to (i) determining that said at least one of the requests in the given batch have finished execution and (ii) determining that one or more other ones of the requests in the given batch that have not finished execution are within a designated threshold of reaching an out-of-memory condition.

8. The apparatus of claim 4 wherein adjusting the allocation of the memory to one or more of the requests in the given batch is performed (i) responsive to determining that said at least one of the requests in the given batch have finished execution and (ii) proactively prior to determining that one or more other ones of the requests in the given batch that have not finished execution are within a designated threshold of reaching an out-of-memory condition.

9. The apparatus of claim 1 wherein a given one of the one or more memory reallocation conditions comprises determining that one or more of the requests in the given batch are within a designated threshold of reaching an out-of-memory condition.

10. The apparatus of claim 9 wherein the designated threshold of reaching the out-of-memory condition is determined based at least in part on a ratio of the maximum output sequence length of the at least one machine learning model to the over-batching multiplier.

11. The apparatus of claim 9 wherein adjusting the allocation of the memory to one or more of the requests in the given batch comprises:
selecting one or more of the requests in the given batch to drop;
deallocating a portion of the memory previously allocated to the selected one or more requests in the given batch; and
re-allocating the portion of the memory previously allocated to the selected one or more requests in the given batch to one or more other requests in the given batch.

12. The apparatus of claim 11 wherein selecting one or more of the requests in the given batch to drop comprises selecting at least one of the one or more requests that are within the designated threshold of reaching the out-of-memory condition.

13. The apparatus of claim 11 wherein the at least one processing device is further configured to re-queue at least one of the selected one or more requests in the given batch for execution in one or more other batches.

14. The apparatus of claim 11 wherein the at least one processing device is further configured to continue execution of at least one of the selected one or more requests in the given batch without caching its associated output sequence in the memory.

15. A computer program product comprising a non-transitory processor-readable storage medium having stored therein program code of one or more software programs, wherein the program code when executed by at least one processing device causes the at least one processing device:
to determine, for a given batch to be executed utilizing at least one machine learning model, a number of requests to include in the given batch based at least in part on an over-batching multiplier;
to allocate memory for processing the given batch utilizing the at least one machine learning model, wherein an amount of memory allocated for at least one of the requests in the given batch is less than that required for storage of a maximum output sequence length of the at least one machine learning model;
to execute the given batch utilizing the at least one machine learning model;
to determine, during execution of the given batch utilizing the at least one machine learning model, whether one or more memory reallocation conditions have been triggered; and
responsive to determining that at least one of the one or more memory reallocation conditions has been triggered, to adjust the allocation of the memory to one or more of the requests in the given batch.

16. The computer program product of claim 15 wherein a given one of the one or more memory reallocation conditions comprises determining that at least one of the requests in the given batch have finished execution, and wherein adjusting the allocation of the memory to one or more of the requests in the given batch comprises:
- deallocating a portion of the memory previously allocated to said at least one of the requests in the given batch that have finished execution; and
- re-allocating the portion of the memory previously allocated to said at least one of the requests in the given batch that have finished execution to one or more other ones of the requests in the given batch that have not finished execution.

17. The computer program product of claim 15 wherein a given one of the one or more memory reallocation conditions comprises determining that one or more of the requests in the given batch are within a designated threshold of reaching an out-of-memory condition, and wherein adjusting the allocation of the memory to one or more of the requests in the given batch comprises:
- selecting one or more of the requests in the given batch to drop;
- deallocating a portion of the memory previously allocated to the selected one or more requests in the given batch; and
- re-allocating the portion of the memory previously allocated to the selected one or more requests in the given batch to one or more other requests in the given batch.

18. A method comprising:
- determining, for a given batch to be executed utilizing at least one machine learning model, a number of requests to include in the given batch based at least in part on an over-batching multiplier;
- allocating memory for processing the given batch utilizing the at least one machine learning model, wherein an amount of memory allocated for at least one of the requests in the given batch is less than that required for storage of a maximum output sequence length of the at least one machine learning model;
- executing the given batch utilizing the at least one machine learning model;
- determining, during execution of the given batch utilizing the at least one machine learning model, whether one or more memory reallocation conditions have been triggered; and
- responsive to determining that at least one of the one or more memory reallocation conditions has been triggered, adjusting the allocation of the memory to one or more of the requests in the given batch;
- wherein the method is performed by at least one processing device comprising a processor coupled to a memory.

19. The method of claim 18 wherein a given one of the one or more memory reallocation conditions comprises determining that at least one of the requests in the given batch have finished execution, and wherein adjusting the allocation of the memory to one or more of the requests in the given batch comprises:
- deallocating a portion of the memory previously allocated to said at least one of the requests in the given batch that have finished execution; and
- re-allocating the portion of the memory previously allocated to said at least one of the requests in the given batch that have finished execution to one or more other ones of the requests in the given batch that have not finished execution.

20. The method of claim 18 wherein a given one of the one or more memory reallocation conditions comprises determining that one or more of the requests in the given batch are within a designated threshold of reaching an out-of-memory condition, and wherein adjusting the allocation of the memory to one or more of the requests in the given batch comprises:
- selecting one or more of the requests in the given batch to drop;
- deallocating a portion of the memory previously allocated to the selected one or more requests in the given batch; and
- re-allocating the portion of the memory previously allocated to the selected one or more requests in the given batch to one or more other requests in the given batch.

\* \* \* \* \*